US 8,102,097 B2

(12) United States Patent
Naruse et al.

(10) Patent No.: US 8,102,097 B2
(45) Date of Patent: Jan. 24, 2012

(54) ELECTROSTATIC ACTING DEVICE INCLUDING AN ELECTRET FILM

(75) Inventors: Yohko Naruse, Ichinomiya (JP);
Yoshinori Shishida, Yoro-gun (JP);
Naoteru Matsubara, Ichinomiya (JP);
Yoshiki Murayama, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 335 days.

(21) Appl. No.: 12/513,005

(22) PCT Filed: Oct. 26, 2007

(86) PCT No.: PCT/JP2007/070876
§ 371 (c)(1),
(2), (4) Date: Apr. 30, 2009

(87) PCT Pub. No.: WO2008/053793
PCT Pub. Date: May 8, 2008

(65) Prior Publication Data
US 2010/0109472 A1    May 6, 2010

(30) Foreign Application Priority Data

Oct. 30, 2006  (JP) .................................. 2006-293559
Mar. 23, 2007  (JP) .................................... 2007-76872

(51) Int. Cl.
*H02N 1/00* (2006.01)
*H03H 9/24* (2006.01)
*B81B 3/00* (2006.01)
(52) U.S. Cl. ......... 310/309; 310/308; 310/310; 310/300
(58) Field of Classification Search .................. 310/300, 310/309, 308; 307/400; *H02N 1/00; B81B 3/00; H03H 9/24*
See application file for complete search history.

(56) References Cited

U.S. PATENT DOCUMENTS

| 4,149,095 | A  | * | 4/1979  | Poirier et al. ................. 307/400 |
| 7,449,811 | B2 |   | 11/2008 | Suzuki et al. |
| 2003/0209668 | A1 | * | 11/2003 | Tohyama ................... 250/338.1 |
| 2004/0155556 | A1 | * | 8/2004  | Onoda et al. .................. 310/309 |
| 2005/0093156 | A1 | * | 5/2005  | Naruse et al. ................. 257/751 |

(Continued)

FOREIGN PATENT DOCUMENTS

JP          4112683 A      4/1992
(Continued)

OTHER PUBLICATIONS

Tsutsumino et al., Seismic Power Generator Using High-Performance Polymer Electret, MEMS, Jan. 2006, pp. 22-26.

(Continued)

*Primary Examiner* — Quyen Leung
*Assistant Examiner* — Terrance Kenerly
(74) *Attorney, Agent, or Firm* — Ditthavong Mori & Steiner, P.C.

(57) ABSTRACT

An electrostatic acting device in which leakage of charge from an electret film is suppressed. The electrostatic acting device comprises a movable electrode section (20) having a movable electrode (22), a fixed electrode section (10) having an electret film (12) opposed to the movable section (20) at a predetermined distance and capable of storing charge and a conductive layer (14) formed on a predetermined region on the upper surface of the electret film (12), and an insulating film (13) interposed between the electret film (12) and the conductive layer (14).

19 Claims, 11 Drawing Sheets

U.S. PATENT DOCUMENTS

| | | | |
|---|---|---|---|
| 2005/0161673 A1* | 7/2005 | Doi et al. | 257/59 |
| 2006/0066174 A1* | 3/2006 | Akiba et al. | 310/309 |
| 2006/0170508 A1* | 8/2006 | Tanaka | 331/154 |
| 2006/0214534 A1* | 9/2006 | Thomas | 310/309 |
| 2008/0258565 A1* | 10/2008 | Murayama et al. | 307/400 |
| 2009/0079295 A1* | 3/2009 | Naruse et al. | 310/300 |
| 2010/0079031 A1* | 4/2010 | Murayama et al. | 310/309 |

FOREIGN PATENT DOCUMENTS

| | | |
|---|---|---|
| JP | 2005333716 A | 12/2005 |
| JP | 2006180450 A | 7/2006 |

OTHER PUBLICATIONS

Genda et al., Charging Method of Micropatterned Electrets by Contact Electrification Using Mercury, Japanese Journal of Applied Physics, Jul. 8, 2005, pp. 5062-5067, vol. 44, No. 7A.

International Search Report, PCT/JP2007/070876, Sanyo Electric Co., Jan. 16, 2008, pp. 38-39, Japan.

* cited by examiner

ELECTROSTATIC ACTING DEVICE INCLUDING AN ELECTRET FILM

TECHNICAL FIELD

The present invention relates to an electrostatic acting device, and more particularly, it relates to an electrostatic acting device comprising an electret film.

BACKGROUND ART

An electrostatic power generator and an electrostatic actuator each comprising an electret film are disclosed in Japanese Patent Laying-Open Nos. 2006-180450 and 4-112683 respectively, in general.

This electrostatic power generator disclosed in Japanese Patent Laying-Open No. 2006-180450 is constituted by two substrates provided to be opposed to each other at a prescribed distance therebetween. A plurality of strip-shaped electrodes are formed on a surface, opposed to the second substrate, of the first substrate. A plurality of strip-shaped conductive layers are formed on a surface, opposed to the first substrate, of the second substrate, and an electret film made of a charge holding material is formed on this conductive layers. In this electrostatic power generator, at least one of the two substrates repeatedly vibrates by receiving inertial force, whereby charges induced in the electrodes opposed to the electret film are changed due to charges stored in the electret film and hence the changed charges are output as a current.

The electrostatic actuator disclosed in Japanese Patent Laying-Open No. 4-112683 is constituted by a stator including a plurality of electrodes and a vibrator including a substrate made of Teflon (registered trademark). A prescribed region of this substrate made of Teflon (registered trademark) is partially made as an electret by corona discharge. More specifically, one region, made as the electret, of the substrate made of Teflon (registered trademark) is in the form of a strip and a plurality of strip-shaped regions made as the electrets are formed on the substrate at constant intervals. The plurality of electrodes included in the stator and the plurality of regions, made as the electrets, of the substrate made of Teflon (registered trademark) are arranged to be opposed to each other, and the potentials of these plurality of electrodes are changed (a positive voltage, 0 and a negative voltage), whereby the vibrator included in the substrate made of Teflon (registered trademark) is moved in a horizontal direction with respect to the opposed stator.

In the electrostatic power generator disclosed in Japanese Patent Laying-Open No. 2006-180450, however, the electret film made of the charge holding material is formed in the form of a strip and there is a problem that charges flow out of the ends of the strip-shaped electret film. Thus, the quantity of charges stored in the electret film is reduced, and hence the quantity of power generated in the electrostatic power generator is reduced.

In the electrostatic actuator disclosed in Japanese Patent Laying-Open No. 4-112683, there is a problem that charges flow out of the plurality of regions, made as the electrets, of the substrate made of Teflon (registered trademark) to regions not made as the electrets. Thus, difference between the potential of each region not made as the electret and the potential of each region made as the electret is reduced, and hence a moving operation and a stop operation of the vibrator are slowly switched. This substrate of Teflon (registered trademark) partially made as the electret which is disclosed in Japanese Patent Laying-Open No. 4-112683 is conceivably employed as the second substrate of the electrostatic power generator disclosed in Japanese Patent Laying-Open No. 2006-180450. In this case, however, difference between the potential of each region made as the electret and the potential of each region not made as the electret is reduced, whereby the changed quantity of charges induced in the electrodes opposed to the substrate made of Teflon (registered trademark) is reduced and hence the quantity of power generated in the electrostatic power generator is reduced.

DISCLOSURE OF THE INVENTION

The present invention has been proposed to solve the aforementioned problems, and an object of the present invention is to provide an electrostatic acting device in which flow out of charges from an electret film can be suppressed.

An electrostatic acting device according to an aspect of the present invention comprises a first electrode section including a first electrode, a second electrode section provided to be opposed to the first electrode section at a prescribed distance and including an electret film capable of storing charges and a first conductive layer formed on a prescribed region of an upper surface of the electret film, and a first insulating film interposed between the electret film and the first conductive layer.

In this electrostatic acting device according to the aspect, as hereinabove described, the first conductive layer is formed on the prescribed region of the upper surface of the electret film capable of storing charges, whereby when the first conductive layer is grounded or a prescribed voltage is applied to the first conductive layer, for example, the first conductive layer has a function of blocking an electric field resulting from charges stored in the electret film, and hence in the surface, opposed to the first electrode section, of the second electrode section, an electric field of a region where the first conductive layer is formed is rendered smaller while an electric field of a region where the electret film is exposed is rendered larger. In a case of employing an electrostatic power generator as the electrostatic acting device, at least one of the first electrode section and the second electrode section repeatedly vibrates by receiving inertial force, whereby the region having a large electric field and the region having a small electric field exists on the surface of the second electrode section, and hence the quantity of charges induced in the first electrode opposed to the electret film is changed. Thus, the changed quantity of the charges induced in the first electrode can be outputted as a current. In a case of employing an electrostatic actuator as the electrostatic acting device, a signal (voltage) is applied to the first electrode section, whereby the second electrode section can be moved by Coulomb force acting between the first electrode section and the electret film included in the second electrode section.

Thus, the region having a large electric field and the region having a small electric field can be produced on the surface of the second electrode section without working (pattering) the electret film interdigitally, for example, and hence charges flowing out of ends of the electret film can be reduced as compared with the case of working the electret film. Consequently, the quantity of power generation can be inhibited from reduction in the case of employing the electrostatic power generator as the electrostatic acting device.

Further, in the case of employing the electrostatic actuator as the electrostatic acting device, a voltage applied to the first electrode section can be reduced as compared with a case where the electret film is worked, and hence power consumption of the electrostatic actuator can be reduced. When charges are entirely distributed on the surface of the electret film, charges do not flow out of a region made as an electret to a region not made as the electret, as in a film locally made as the electret. Thus, difference between a potential of the region made as the electret and a potential of the region not made as the electret is not reduced. Thus, in the case of employing the electrostatic power generator as the electrostatic acting device, the changed quantity of charges induced in the first electrode opposed to the electret film can be inhibited from reduction and hence the quantity of power generation can be inhibited from reduction. In the case of employing the electrostatic actuator as the electrostatic acting device, a voltage applied to the first electrode section can be reduced as compared with a case of employing the film locally made as the electret, and hence power consumption of the electrostatic actuator can be reduced.

In the film locally made as the electret, the first conductive layer is arranged on the surface of the region not made as the electret, whereby the first conductive layer arranged on the surface of the region not made as the electret can block an electric field resulting from charges flowing to the region not made as the electret also when charges move from the region made as the electret to the region not made as the electret, and hence change of an electric field on a boundary between the region made as the electret and the region not made as the electret can be inhibited from becoming gentle. The first insulating film is interposed between the electret film and the first conductive layer, whereby the electret film and the first conductive layer are separated by the insulating film, and hence charges can be inhibited from flowing out of the electret film to the first conductive layer. Thus, the quantity of power generation can be inhibited from reduction in the case of employing the electrostatic power generator as the electrostatic acting device. In the case of employing the electrostatic actuator as the electrostatic acting device, power consumption of the electrostatic actuator can be more reduced as compared with a case where the insulating film is not interposed between the electret film and the conductive layer.

In the aforementioned electrostatic acting device according to the aspect, the first conductive layer and the first insulating film are preferably formed in the same shape in plan view. According to this structure, the first conductive layer and the first insulating film can be easily simultaneously worked.

The aforementioned electrostatic acting device according to the aspect preferably further comprises a second insulating film formed on a surface, opposed to the first electrode, of the electret film, and inhibiting charges from flowing out of the surface of the electret film. According to this structure, the second insulating film can inhibit charges from flowing out of the electret film to the first conductive layer and inhibit charges from flowing out of the surface, on which the first conductive layer is not formed, of the electret film. Thus, the quantity of power generation can be effectively inhibited from reduction in the case of employing the electrostatic power generator as the electrostatic acting device. In the case of employing the electrostatic actuator as the electrostatic acting device, power consumption of the electrostatic actuator can be more reduced as compared with a case of providing no second insulating film.

In this case, the second insulating film is preferably formed on an overall surface of the electret film. According to this structure, charges can be more inhibited from flowing out of the electret film as compared with a case where the second insulating film is partially formed on the surface of the electret film.

In the aforementioned electrostatic acting device where the second insulating film is formed on the surface of the electret film, the first insulating film may be formed on a surface of the second insulating film, and the surface, on which the first insulating film is formed, of the second insulating film may be convexed.

In the aforementioned electrostatic acting device where the second insulating film is formed on the surface of the electret film, the second insulating film is preferably formed on the surface of the electret film, side surfaces of the first insulating film and side surface of the first conductive layer. According to this structure, the second insulating film covers the surface of the electret film, and hence the first electrode opposed to the electret film and the electret film can be inhibited from sticking to each other.

In the aforementioned electrostatic acting device according to the aspect, the first electrode preferably includes a plurality of first electrode portions provided at a first interval, and a width of the first conductive layer is preferably larger than the first interval between the first electrode portions which are adjacent to each other. According to this structure, the first conductive layer formed on the electret film can be inhibited from penetrating between the adjacent first electrodes, and hence the first electrode and the electret film can be inhibited from sticking to each other. Thus, charges induced in the first electrode can be inhibited from reduction due to contact between the first electrode and the electret film. According to the aforementioned structure, the electret film can be inhibited from breakage due to the contact between the first electrode and the electret film.

In the aforementioned electrostatic acting device according to the aspect, the first electrode section preferably further includes a first substrate having a surface formed with the first electrode, and a thickness of the first conductive layer formed on the electret film is preferably larger than a thickness of the first electrode formed on the first substrate. According to this structure, the first conductive layer having a large thickness functions as a spacer, and hence the first electrode and the electret film can be inhibited from sticking to each other. Thus, charges induced in the first electrode can be inhibited from reduction due to contact between the first electrode and the electret film. According to the aforementioned structure, the electret film can be inhibited from breakage due to contact between the first electrode and the electret film.

In this case, a third insulating film is preferably formed between the first substrate and the first electrode. According to this structure, the first electrode and the first substrate are separated from each other, and hence the first substrate can be formed by a conductor.

In the aforementioned electrostatic acting device where the third insulating film is formed between the first substrate and the first electrode, the third insulating film may be so formed as to cover a surface of the first substrate.

In the aforementioned electrostatic acting device where the third insulating film is formed between the first substrate and the first electrode, the third insulating film may be formed to have the same shape as the first electrode in plan view.

In the aforementioned electrostatic acting device according to the aspect, the first conductive layer is preferably grounded. According to this structure, a potential of the first conductive layer is fixed and hence an intensity of an electric field on the surface of the electret film can be stabilized.

In the aforementioned electrostatic acting device according to the aspect, a prescribed voltage is preferably applied to the first conductive layer. According to this structure, a voltage reverse in positive and negative to a surface potential of the electret film is applied to a potential of the first conductive layer, whereby an intensity of an electric field on the surface of the electret film can be easily increased.

In the aforementioned electrostatic acting device according to the aspect, a surface, on which the first insulating film is formed, of the electret film may be convexed.

In the aforementioned electrostatic acting device according to the aspect, the second electrode section preferably includes a conductive second substrate having a surface formed with the electret film. According to this structure, the first electrode and the second substrate are connected to each other, whereby electrostatic induction can be easily generated between the first electrode and the second substrate.

In this case, the first electrode and the second substrate are preferably connected to each other through a bridge rectifier circuit. According to this structure, the changed quantity of charges stored in the first electrode can be easily extracted as a current by the bridge rectifier circuit.

In the aforementioned electrostatic acting device according to the aspect, the second electrode section preferably includes an insulating third substrate having a surface formed with the electret film, and a second conductive layer formed between the third substrate and the electret film. According to this structure, the first electrode and the second conductive layer are connected to each other, whereby electrostatic induction can be easily generated between the first electrode and the second conductive layer.

In this case, the second conductive layer may be so formed as to cover a surface of the third substrate.

In the aforementioned electrostatic acting device where the second electrode section includes the third substrate and the second conductive layer, the second conductive layer may be formed to have the same shape as the first conductive layer in plan view.

In the aforementioned electrostatic acting device where the second electrode section includes the third substrate and the second conductive layer, the first electrode and the second conductive layer are preferably connected to each other through a bridge rectifier circuit. According to this structure, the changed quantity of charges stored in the first electrode can be easily extracted as a current by the bridge rectifier circuit.

BEST MODES FOR CARRYING OUT THE INVENTION

Embodiments of the present invention will be now described with reference to the drawings.

First Embodiment

A structure of an electrostatic power generator 1 according to the first embodiment will be described with reference to FIGS. 1 to 4. In this embodiment, a case of applying the present invention to the electrostatic power generator 1 which is an example of an electrostatic acting device will be described.

Figure 1:
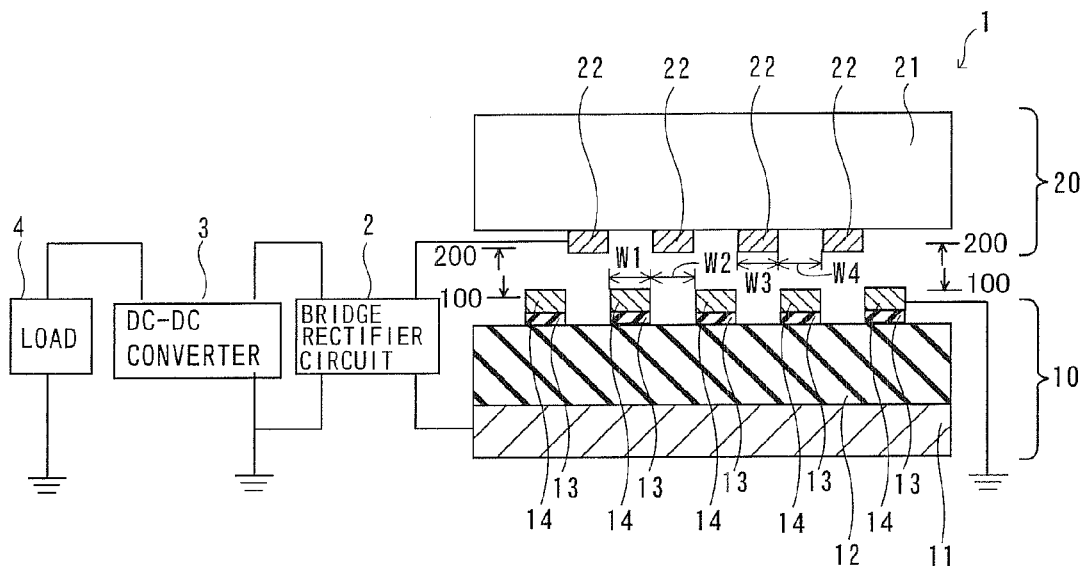
FIG. 1 A sectional view of an electrostatic power generator according to a first embodiment of the present invention.

In this electrostatic power generator 1 according to the first embodiment, a fixed electrode section 10 and a movable electrode section 20 are so arranged as to be opposed to each other, as shown in FIG. 1. The fixed electrode section 10 and the movable electrode section 20 are examples of the "second electrode section" and the "first electrode section" in the present invention respectively. The electrostatic power generator 1 comprises a bridge rectifier circuit 2 for rectifying generated power and a DC-DC converter 3 for converting the voltage of a direct current. A load 4 driven by the power generated by the electrostatic power generator 1 is connected to the DC-DC converter 3. The DC-DC converter 3 and the load 4 are grounded respectively.

Figure 2:
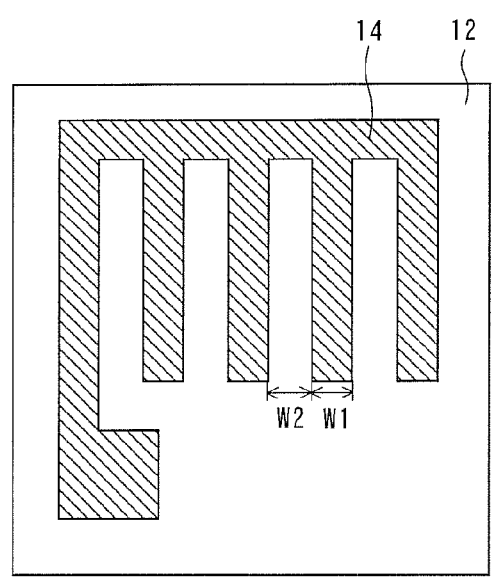
FIG. 2 A sectional view taken along the line 100-100 in FIG. 1.

According to the first embodiment, an electret film of fluororesin typified by polytetrafluoroethylene (PTFE) or a silicon oxide film having a thickness of about 0.1 μm to about 100 μm is formed on a surface of a fixed substrate 11 made of a Al having thickness of about 50 nm to about 1000 nm, as shown in FIG. 1. The fixed substrate 11 is an example of the "second substrate" in the present invention. The electret film 12 is controlled to a potential of about −20 V to about −2000 V by negative charges injected into an overall surface by corona discharge and entirely distributed therein. According to the first embodiment, an insulating film 13 made of a HDP (high density plasma) oxide film, SiOC or SiN, having a thickness of about 10 nm to about 1000 nm is provided. The insulating film 13 is an example of the "first insulating film" in the present invention. According to the first embodiment, the insulating film 13 is interdigitally in plan view, similarly to a conductive layer 14, described later, shown in FIG. 2. The insulating film 13 and the conductive layer 14 may be so formed in substantially the same shape in plan view that the electret film 12 and the conductive layer 14 can be separated. For example, the insulating film 13 may be formed to be larger when the insulating film 13 and the conductive layer 14 are viewed in plan as in a case where the insulating film 13 and the conductive layer 14 are formed to widen in a tapered manner from an upper surface of the conductive layer 14 toward a lower surface of the insulating film 13. According to the first embodiment, the conductive layer 14 having a thickness of about 50 nm to about 1000 nm is formed on an upper surface of the insulating film 13. The conductive layer 14 is an example of the "first conductive layer" in the present invention. According to the first embodiment, the conductive layer 14 is grounded. The conductive layer 14 is interdigitally formed as shown in FIG. 2, and a width W1 of each tooth portion and an interval W2 between the teeth are about 1 mm respectively. The electret film 12 and the conductive layer 14 are not in contact with each other by the insulating film 13. The insulating film 13 and the conductive layer 14 may be oblongly formed.

Figure 3:
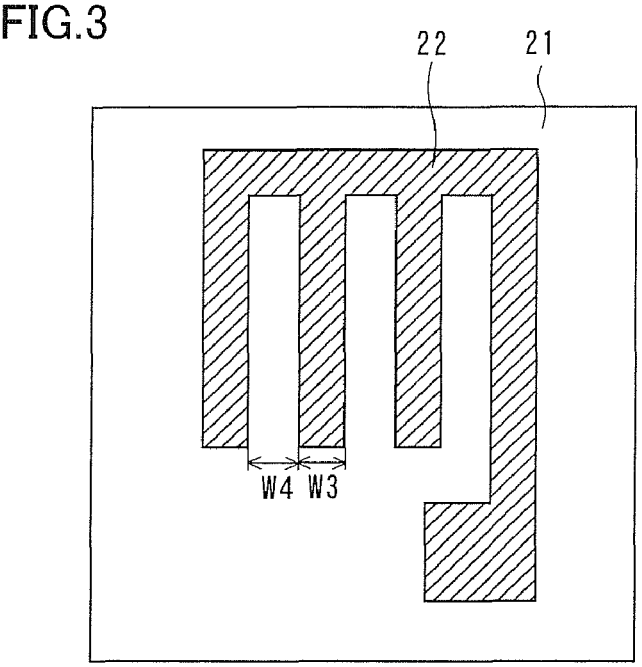
FIG. 3 A sectional view taken along the line 200-200 in FIG. 1.

As shown in FIG. 1, a movable electrode 22 made of Al having a thickness of about 50 nm to about 1000 nm is formed on a lower surface of a movable substrate 21 made of insulating glass having thickness of about 300 μm to about 1000 μm. The movable substrate 21 is an example of the "first substrate" in the present invention. The movable electrode 22 is interdigitally formed as shown in FIG. 3, and a width W3 of each tooth portion and an interval W4 between the teeth are about 1 mm respectively. This movable electrode 22 is an example of the "first electrode" in the present invention. The tooth portions forming the interdigital movable electrode 22 are examples of the "first electrode portion" in the present invention. According to the first embodiment, the fixed substrate 11 and the movable electrode 22 are connected to each other through the bridge rectifier circuit 2.

As shown in FIG. 1, the conductive layer 14 and the movable electrode 22 are arranged so as not to be opposed to each other in a state where vibration is not applied to the electrostatic power generator 1.

Figure 4:
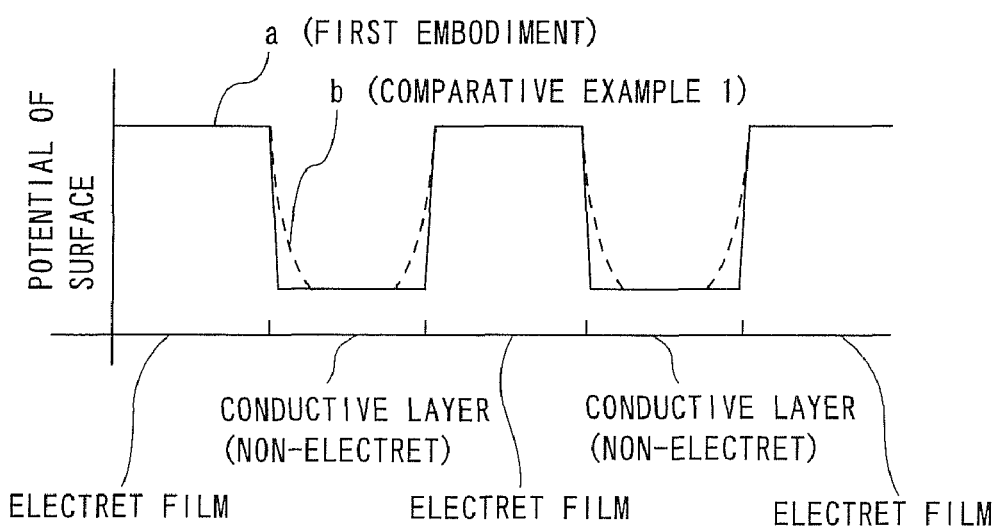
FIG. 4 A diagram schematically showing surface potentials of fixed electrode sections of electrostatic power generators according to the first embodiment of the present invention and comparative example 1.

In the first embodiment, solid lines a shown in FIG. 4 denote a surface potential of the fixed electrode section 10 in viewing the fixed electrode section 10 from a side of the movable electrode 22, the axis of abscissa denotes a region (regions where the electret film 12 is exposed and regions where the conductive layer 14 is formed) of the surface of the fixed electrode section 10 and the axis of ordinate denotes surface potentials of the respective regions. As shown in FIG. 4, the regions where the electret film 12 is exposed and the regions where the conductive layer 14 is formed alternately exist on the surface of the fixed electrode section 10, and the surface potential of the regions where the electret film 12 is exposed are higher in the regions where the electret film 12 is exposed and the regions where the conductive layer 14 is formed. According to the first embodiment shown by the solid lines a in FIG. 4, change of a potential of a boundary between each region where the electret film 12 is exposed and each region where the conductive layer 14 is formed is steep. Dotted lines b shown in FIG. 4 schematically show a case where regions of the electret film 12 corresponding to the conductive layer 14 are formed so as not to be made as an electret as comparative example 1, so that a film only locally made as an electret are prepared and potentials of surfaces are measured, in place of employing the conductive layer 14 of the first embodiment. In this film locally made as the electret according to comparative example 1, charges stored in the regions made as electret flow out to non-electret regions not made as the electret, so that change of a potential of a boundary between each region made as the electret and each non-electret region is gentle as compared with the change of the potential of the first embodiment shown by the solid lines a, as shown in FIG. 4.

The power generating operation of the electrostatic power generator 1 according to the first embodiment of the present invention will be now described with reference to FIGS. 1 and 5.

When no vibration is applied to the electrostatic power generator 1, the surface of the electret film 12 and the movable electrode 22 are arranged to be opposed to each other at a prescribed interval, as shown in FIG. 1.

The surface of the electret film 12 is controlled to the negative potential (about −20 V to about −2000 V), and hence positive charges are induced in the movable electrode 22 by electrostatic induction.

Figure 5:
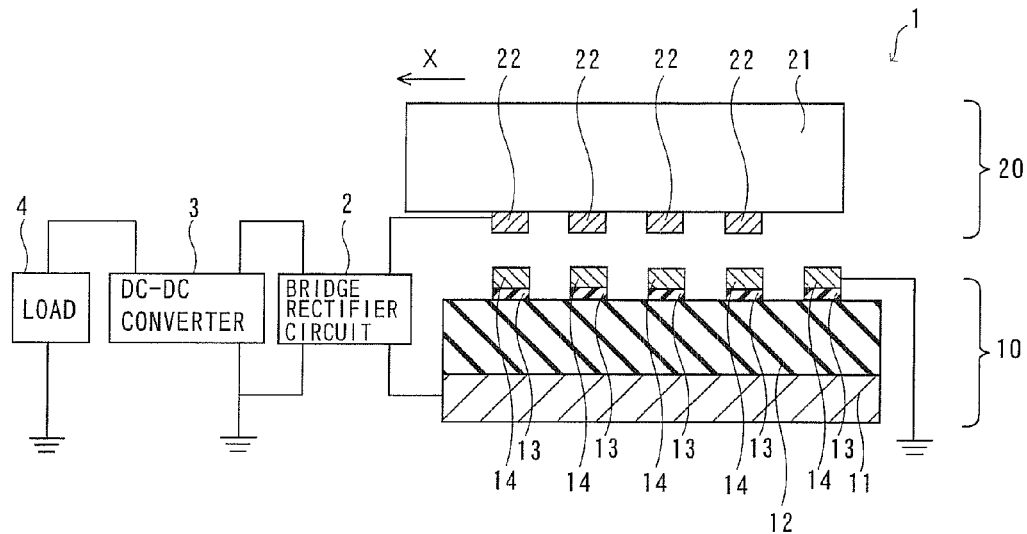
FIG. 5 A sectional view for illustrating a power generating operation of the electrostatic power generator according to the first embodiment of the present invention.

As shown in FIG. 5, horizontal vibration (along arrow X) is applied to the electrostatic power generator 1 and the movable electrode 22 moves along arrow X, so that the movable electrode 22 moves to a position opposed to the conductive layer 14. Thus, the potential opposed to the movable electrode 22 changes from the potential (about −20 V to about −2000 V) of the electret film 12 to the potential (ground potential) of the conductive layer 14, to change the quantity of the charges electrostatically induced in the collector 22. This change in the quantity of the charges forms a current, which in turn is output to the load 4 through the bridge rectifier circuit 2 and the DC-DC converter 3. The movable electrode section 20 repeats a state shown in FIG. 1, a state shown in FIG. 5 and a state (not shown) where the movable electrode section 20 moves in a direction opposite to a direction along arrow X, thereby continuously generating power.

According to the first embodiment, as hereinabove described, the interdigital conductive layer 14 is formed on the surface of the electret film 12 capable of storing charges, whereby the conductive layer 14 formed on the surface of the electret film 12 has a function of blocking an electric field resulting from charges stored in the electret film 12, and hence in the surface, opposed to the movable electrode section 20, of the fixed electrode section 10, an electric field of the regions where the conductive layer 14 is formed is small and an electric field of the regions where the electret film 12 is exposed is large. Thus, the regions having the large electric field and the regions having the electric field can be formed on the surface of the fixed electrode section 10 without working the electret film 12 in an interdigital shape, for example, and hence charges flowing out of ends of the electret film 12 can be reduced as compared with the case of working (patterning) the electret film 12. Consequently, reduction in the quantity of power generation can be inhibited from reduction. It has been confirmed by an experiment, described later, by the inventors that the stored charges are reduced by working the electret film 12. According to the first embodiment, when charges are entirely distributed on the surface of the electret film 12, charges flow out of the regions made as the electret to the regions not made as the electret as in the film locally made as the electret, whereby difference between the potential of the regions made as the electret and the potential of the regions not made as the electret is not reduced. Thus, the changed quantity of charges induced in the movable electrode 22 opposed to the electret film 12 can be inhibited from reduction and hence the quantity of power generation can be inhibited from reduction.

According to the first embodiment, as hereinabove described, the electrostatic power generator 1 comprises the insulating film 13 between the electret film 12 and the conductive layer 14, whereby the electret film 12 and the conductive layer 14 are separated by the insulating film 13 and hence charges can be inhibited from flowing out of the electret film 12 to the conductive layer 14. Thus, the quantity of power generation can be inhibited from reduction.

According to the first embodiment, as hereinabove described, the conductive layer 14 and the insulating film 13 are formed in the same shape in plan view, whereby the conductive layer 14 and the insulating film 13 can be simultaneously worked.

According to the first embodiment, as hereinabove described, the conductive layer 14 is grounded, whereby the potential of the conductive layer 14 is fixed, and hence an intensity of the electric field formed on the surface of the electret film 12 can be stabilized.

According to the first embodiment, as hereinabove described, the fixed substrate 11 is conductive, whereby electrostatic induction between the movable electrode 22 and the fixed substrate 11 can be easily caused by connecting the movable electrode 22 and the fixed substrate 11.

According to the first embodiment, as hereinabove described, the movable electrode 22 and the fixed substrate 11 are connected to each other through the bridge rectifier circuit 2, whereby the changed quantity of charges stored in the movable electrode 22 can be easily extracted as a current by the bridge rectifier circuit 2.

Second Embodiment

In this second embodiment, an electrostatic power generator 1*a* in which a charge outflow inhibition film 15 inhibiting charges from flowing out of a surface of an electret film 12 is provided on an overall surface, opposed to the movable electrode 22, of the electret film will be described with reference to FIG. 6, dissimilarly to the aforementioned first embodiment.

Figure 6:
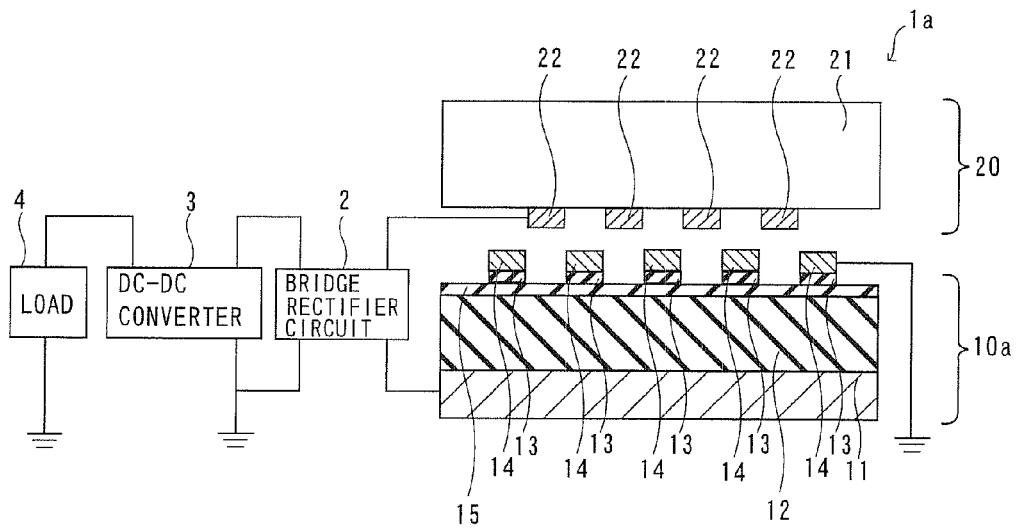
FIG. 6 A sectional view of an electrostatic power generator according to a second embodiment of the present invention.

In this electrostatic power generator 1*a* according to the second embodiment, the charge outflow inhibition film 15 made of an MSQ (methyl silsesquioxane) film, having a thickness of about 10 nm to about 1000 nm is provided on the overall surface, opposed to the movable electrode 20, of the electret film 12 in a fixed electrode section 10*a*, as shown in FIG. 6. The fixed electrode section 10*a* is an example of the "second electrode section" in the present invention. The charge outflow inhibition film 15 is an example of the "second insulating film" in the present invention. This charge outflow inhibition film 15 does not hold charges, but has a function of suppressing flow out of charges from the electret film 12 by adhering the same to the electret film 12. An insulating film 13 made of SiOC, having a thickness of about 10 nm to about 1000 nm is provided on a surface of the charge outflow inhibition film 15. The insulating film 13 is interdigitally formed in plan view similarly to the conductive layer 14 shown in FIG. 2. An interdigital conductive layer 14 having a thickness of about 50 to about 1000 nm is formed on a surface of the insulating film 13. The remaining structure of the second embodiment is similar to that of the first embodiment.

According to the second embodiment, as hereinabove described, the charge outflow inhibition film 15 inhibiting charges from flowing out of the surface of the electret film 12 is provided on the overall surface, opposed to the movable electrode section 20, of the electret film 12, whereby the charge outflow inhibition film 15 can inhibit charges from flowing out of the electret film 12 to the conductive layer 14 and inhibit charges from flowing out of the surface, on which the conductive layer 14 is not formed, of the electret film 12. Thus, the quantity of power generation can be effectively inhibited from reduction.

According to the second embodiment, as hereinabove described, the charge outflow inhibition film 15 is formed on the overall surface of the electret film 12, whereby charges can be more inhibited from flowing out of the electret film 12 as compared with a case where the charge outflow inhibition film 15 is partially formed on the surface of the electret film 12.

The remaining effects of the second embodiment are similar to those of the aforementioned first embodiment.

Third Embodiment

In this third embodiment, an electrostatic power generator 1*b* in which a conductive layer 14 is controlled to a prescribed positive potential in place of grounding the conductive layer 14 will be described with reference to FIG. 7, dissimilarly to the aforementioned first embodiment.

Figure 7:
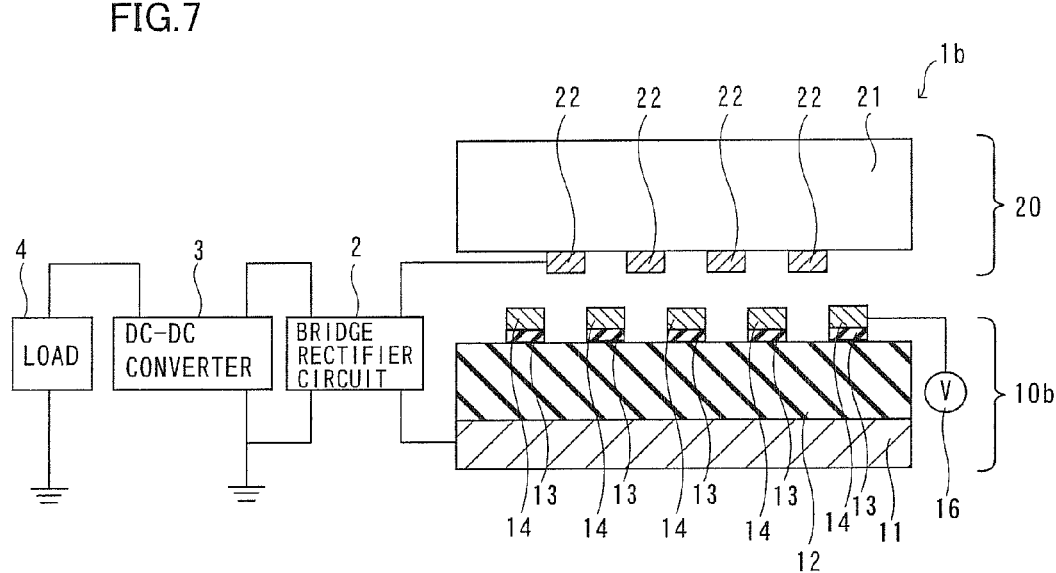
FIG. 7 A sectional view of an electrostatic power generator according to a third embodiment of the present invention.

In this electrostatic power generator 1*b* according to the third embodiment, the conductive layer 14 is controlled to a potential (about 1 V to about 10 V) reverse in code to a potential (about −20 V to about −2000 V) of the electret film 12 by applying a voltage 16 of about 1 V to about 10 V to the conductive layer 14, in a fixed electrode section 10*b*, as shown in FIG. 7. The fixed electrode section 10*b* is an example of the "second electrode section" in the present invention. The remaining structure of this third embodiment is similar to that of the first embodiment.

According to the third embodiment, as hereinabove described, the conductive layer 14 is controlled to the potential reverse in code to the potential of the electret film 12, whereby difference between the potential (about −20 V to about −2000 V) of the surface of the electret film and the potential of the conductive layer 14 is increased as compared with a case of grounding the conductive layer 14, and hence the changed quantity of the charges induced in the movable electrode 22 by electrostatic induction is increased as compared with the case of grounding the conductive layer 14. Thus, the quantity of power generation can be increased.

The remaining effects of the third embodiment are similar to those of the aforementioned first embodiment.

Fourth Embodiment

In this fourth embodiment, an electrostatic power generator 1*c* in which a width W5 of a conductive layer 14*a* is larger than an interval W6 between a movable electrode will be described with reference to FIG. 8, dissimilarly to the aforementioned first embodiment.

Figure 8:
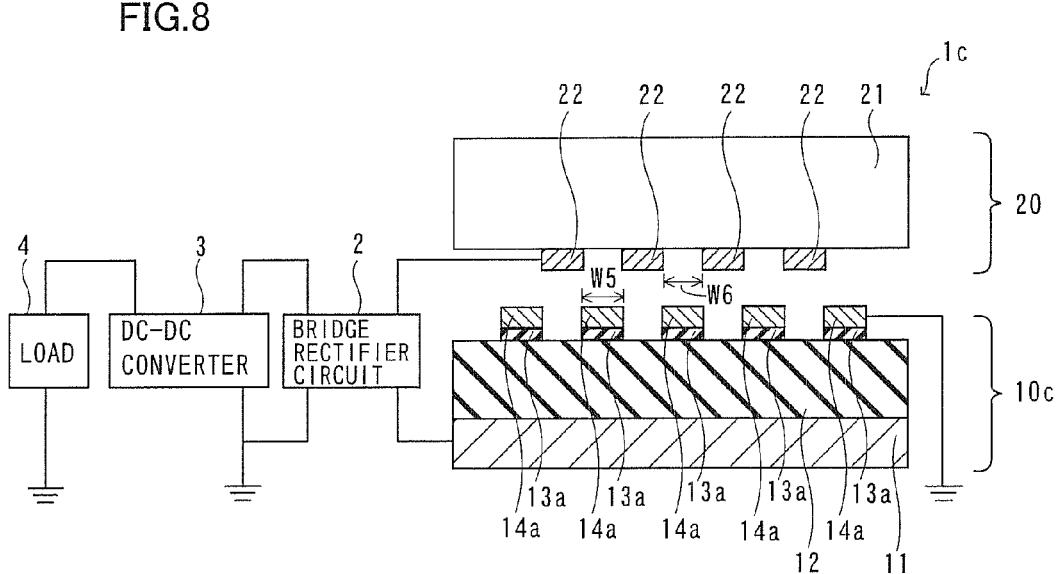
FIG. 8 A sectional view of an electrostatic power generator according to a fourth embodiment of the present invention.

In other words, in this electrostatic power generator 1c according to the fourth embodiment, the width W5 (about 1.1 mm) of tooth portions forming the interdigital conductive layer 14a is formed to be larger than the interval W6 (about 0.9 mm) between teeth forming the interdigital movable electrode 22 in a fixed electrode section 10c, as shown in FIG. 8. The fixed electrode section 10c is an example of the "second electrode section" in the present invention. The conductive layer 14a is an example of the "first conductive layer" in the present invention.

The remaining structure of this fourth embodiment is similar to that of the aforementioned first embodiment.

According to the fourth embodiment, as hereinabove described, the width W5 of the tooth portions forming the interdigital conductive layer 14a is formed to be larger than the interval W6 between the teeth forming the interdigital movable electrode 22, whereby the conductive layer 14a formed on the electret film 12 is inhibited from penetrating between the adjacent movable electrode 22, and hence the movable electrode 22 and the electret film 12 can be inhibited from sticking to each other. Thus, charges induced in the movable electrode 22 can be inhibited from reduction due to contact between the movable electrode 22 and the electret film 12. According to the aforementioned structure, the electret film 12 can be inhibited from breakage due to the contact between the movable electrode 22 and the electret film 12.

The remaining effects of the fourth embodiment are similar to those of the aforementioned first embodiment.

Fifth Embodiment

In this fifth embodiment, an electrostatic power generator 1d in which a thickness of a layer formed by stacking an insulating film 13 and a conductive layer 14b is larger than a thickness of a movable electrode 22 will be described with reference to FIG. 9, dissimilarly to the aforementioned first embodiment.

Figure 9:
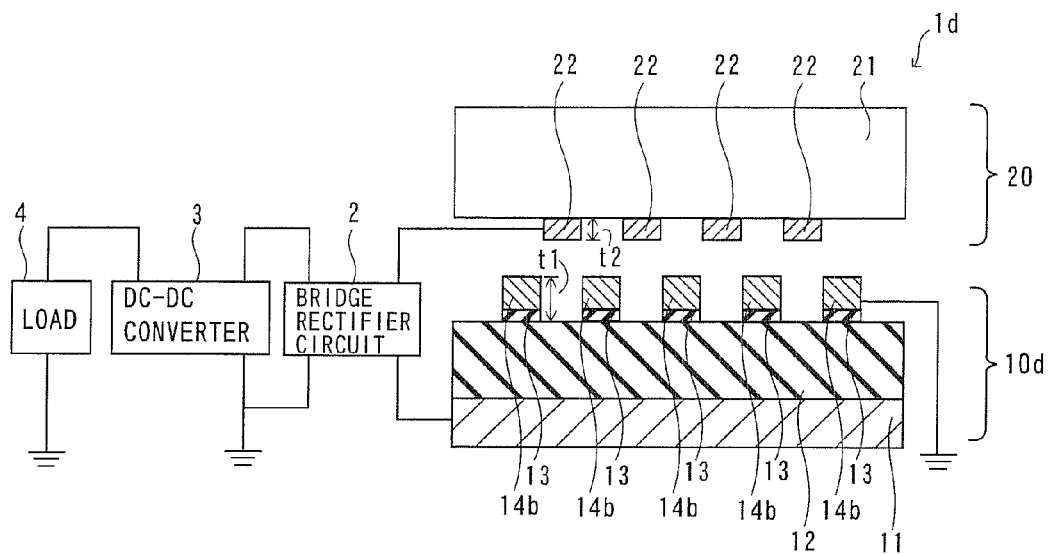
FIG. 9 A sectional view of an electrostatic power generator according to a fifth embodiment of the present invention.

In other words, in this electrostatic power generator 1d according to the fifth embodiment, the thickness t1 of the layer formed by stacking the insulating film 13 and the conductive layer 14b formed on the electret film 12 is formed to be larger than the thickness t2 of the movable electrode 22 formed on a lower surface of the movable substrate 21 in a fixed electrode section 10d, as shown in FIG. 9. The fixed electrode section 10d is an example of the "second electrode section" in the present invention. The remaining structure of this fifth embodiment is similar to that of the aforementioned first embodiment.

According to the fifth embodiment, as hereinabove described, the thickness t1 of the layer formed by stacking the insulating film 13 and the conductive layer 14b formed on the electret film 12 is formed to be larger than the thickness t2 of the movable electrode 22 formed on the lower surface of the movable substrate 21, whereby the insulating film 13 and the conductive layer 14b having a larger thickness function as a spacer, and hence the movable electrode 22 and the electret film 12 can be inhibited from sticking to each other. Thus, charges induced in the movable electrode 22 can be inhibited from reduction due to contact between the movable electrode 22 and the electret film 12. According to the aforementioned structure, the electret film 12 can be inhibited from breakage due to the contact between the movable electrode 22 and the electret film 12.

The remaining effects of the fifth embodiment are similar to those of the aforementioned first embodiment.

Sixth Embodiment

Figure 10:
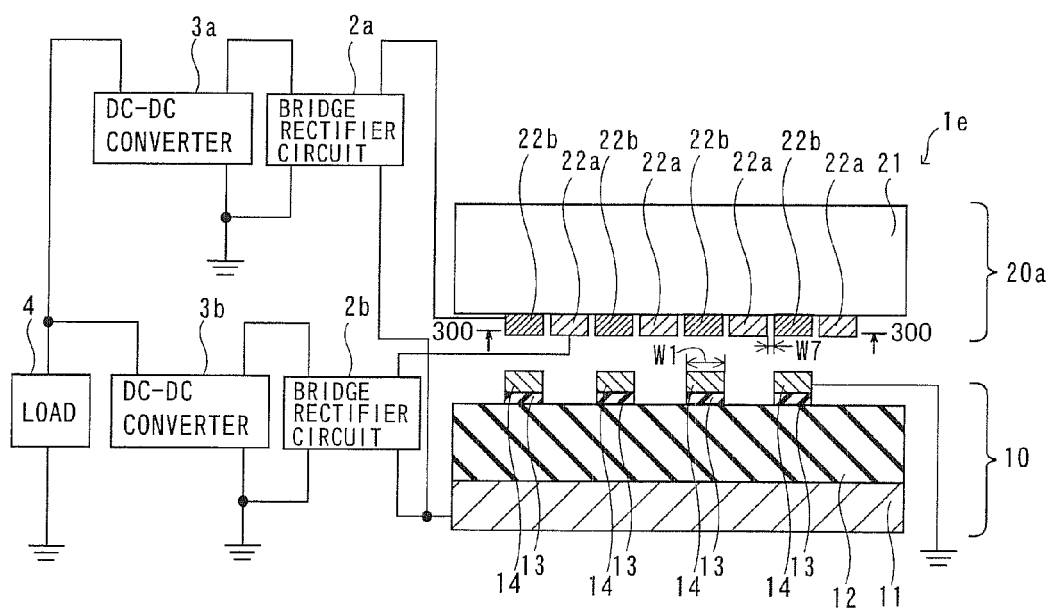
FIG. 10 A sectional view of an electrostatic power generator according to a sixth embodiment of the present invention.

In this sixth embodiment, an electrostatic power generator 1e in which two interdigital movable electrodes 22a and 22b are formed on a lower surface of a movable substrate 21 will be described with reference to FIGS. 10 and 11 dissimilarly to the aforementioned first embodiment.

Figure 11:
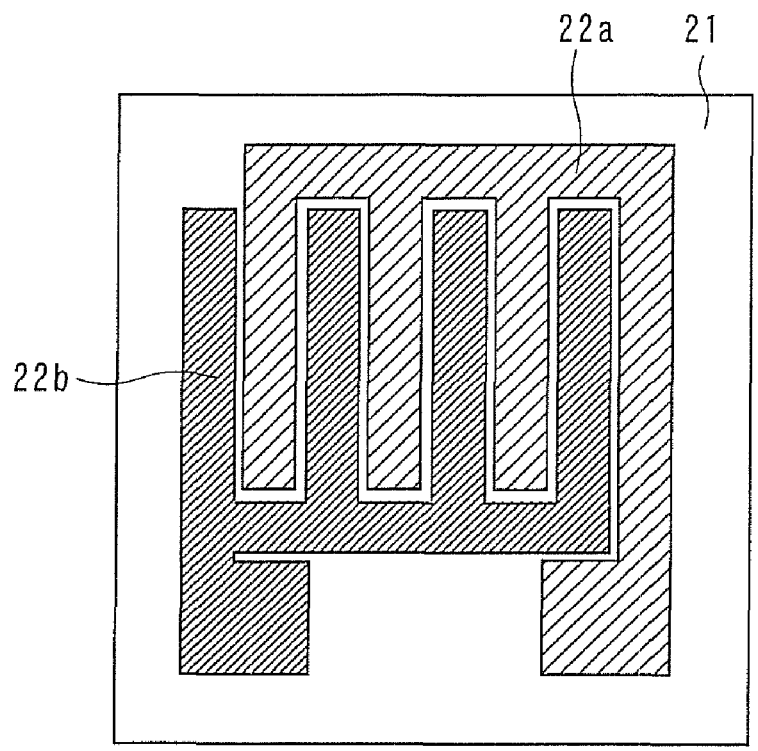
FIG. 11 A sectional view taken along the line 300-300 in FIG. 10.

In the electrostatic power generator 1e according to the sixth embodiment, the interdigital movable electrodes 22a and 22b are opposed to each other on the lower surface of the movable substrate 21 in a movable electrode section 20a and so arranged that teeth forming the respective electrodes are alternately interlocked with each other, as shown in FIG. 11. The movable electrode section 20a is an example of the "first electrode section" in the present invention. The movable electrodes 22a and 22b are examples of the "first electrode" in the present invention. The movable electrode 22a and the movable electrode 22b are arranged at an interval of about 30 μm. As shown in FIG. 10, the movable electrode 22a and the movable electrode 22b are connected to separate bridge rectifier circuits 2a and 2b respectively. The bridge rectifier circuit 2a and the bridge rectifier circuit 2b are connected to separate DC-DC converters 3a and 3b respectively. The DC-DC converter 3a and the DC-DC converter 3b are connected to a common load 4 driven by power generated by the electrostatic power generator 1e. The remaining structure of this sixth embodiment is similar to that of the first embodiment.

According to the sixth embodiment, as hereinabove described, two electrodes of the interdigital movable electrodes 22a and 22b are formed on the lower surface of the movable substrate 21, whereby charges are induced in the movable electrode 22a opposed to an electret film 12 by electrostatic induction resulting from charges stored in the electret film 12, and change of charges induced when opposed to the electret film 12 and charges induced when opposed to the conductive layer 14 can be outputted as a current from the movable electrode 22b opposed to the conductive layer 14, and hence induction of charges by electrostatic induction and output of a current can be simultaneously performed by single vibration. Consequently, the quantity of power generation can be further increased as compared with a case of the aforementioned first embodiment where the single movable electrode 22 is formed on the movable substrate 21. An interval W7 between the teeth forming the interdigital movable electrodes 22a and 22b is formed to be larger than the width W1 of teeth portions forming the interdigital conductive layer 14, whereby the conductive layer 14 formed on the electret film 12 is inhibited from penetrating between the movable electrode 22a and the movable electrode 22b which are adjacent to each other, and hence the movable electrodes 22a and 22b and the electret film 12 can be inhibited from sticking to each other. Thus, charges induced in the movable electrode 22a and the movable electrode 22b can be inhibited from reduction due to contact between the movable electrodes 22a and 22b and the electret film 12. According to the aforementioned structure, the electret film 12 can be inhibited from breakage due to the contact between the movable electrodes 22a and 22b and the electret film 12.

The remaining effects of the seventh embodiment are similar to those of the aforementioned first embodiment.

Experiment 1

Figure 12:
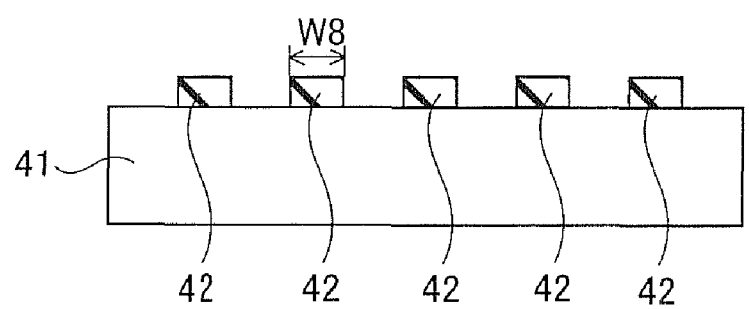
FIG. 12 A sectional view of a sample of an experiment conducted for measuring a surface potential of an interdigital electret film formed on a silicon substrate.
Figure 13:
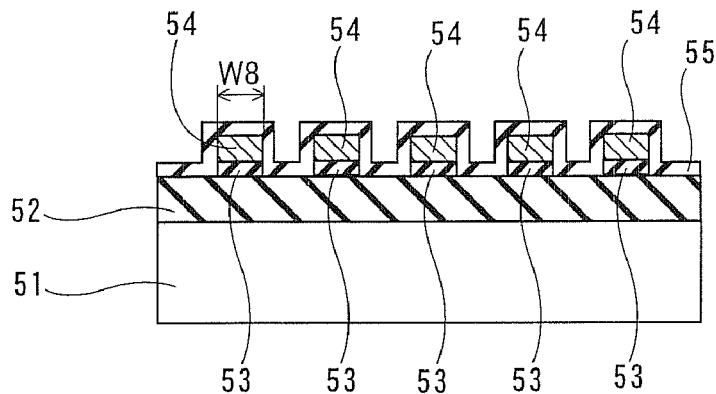
FIG. 13 A sectional view of a sample of an experiment conducted for measuring a surface potential of an electret film in a case where an interdigital insulating film and an interdigital conductive layer are formed on an electret film.

An experiment 1 conducted for comparing a surface potential of the electret film in a case where the conductive layer was formed on the surface of the electret film with a surface potential of the electret film in a case where the electret film was interdigitally worked will be now described with reference to FIGS. 12 to 16. In this experiment 1, an electret film 42 made of a silicon oxide film, having a thickness of 1 μm was formed on a silicon substrate 41 and interdigitally worked, and corona discharge of 10000 V was thereafter applied to the electret film 42 to prepare a sample (comparative example 2), as shown in FIG. 12. As shown in FIG. 13, an electret film 52 having a thickness of 1 μm was formed on a silicon substrate 51 and corona discharge of 10000 V was applied to the electret film 52, and thereafter an insulating film made of a HDP (high density plasma) oxide film was interdigitally formed on a surface of the electret film 52 and a conductive layer 54 having a thickness of 0.3 μm was interdigitally formed on a surface of the insulating film 53, to prepare a sample corresponding to the first embodiment. A charge outflow inhibition film 55 made of MSQ is formed on surfaces of the electret film 52 and the conductive layer 54 and side surfaces of the insulating film 53. Three types of samples having thicknesses of the insulating films 53 of 0 μm (no insulating film), 1 μm and 2 μm respectively were prepared. In this experiment, surface potentials of the electret film 42 and the electret film 52 are measured when a width W8 forming tooth portions forming the interdigital electret film 42 and a width W8 of tooth portions forming the interdigital conductive layer 54 were changed. In the samples corresponding to the first embodiment prepared by forming the conductive layers 54 on the surfaces of the insulating films 53 respectively, shown in FIG. 13, the conductive layers 54 were grounded once and the potentials of the surfaces of the electret films 52 were thereafter measured.

Figure 14:
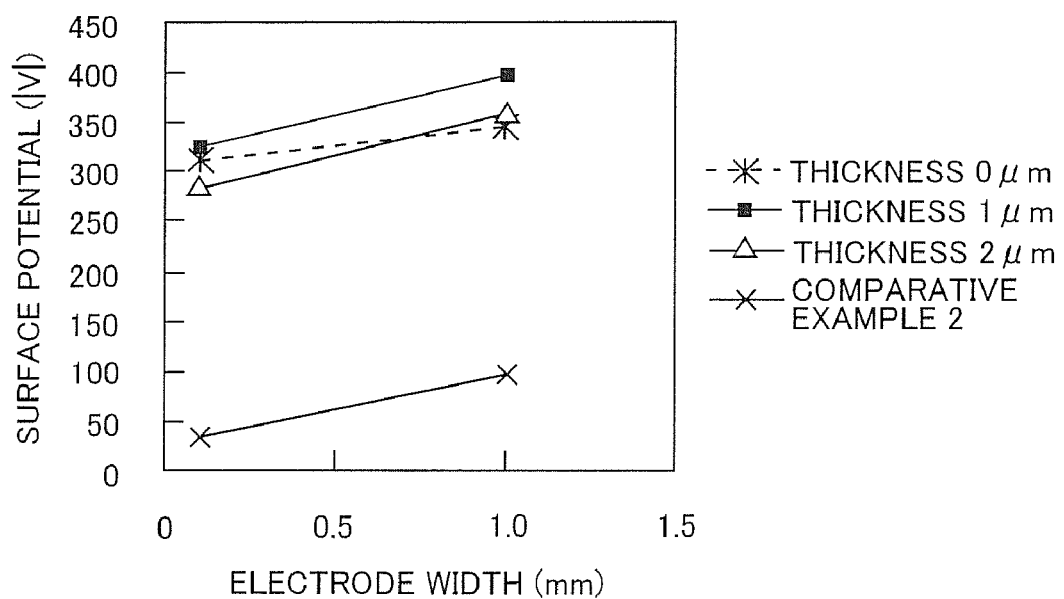
FIG. 14 A diagram showing the relation between widths of teeth forming the interdigital conductive layers, thicknesses of insulating layers and surface potentials of electret films.

FIG. 14 shows the measurement results of the surface potentials of the electret films 42 and 52 of the samples shown in FIGS. 12 and 13. The axis of ordinate denotes absolute values of the surface potentials of the electret films 42 and 52. The axis of abscissa denotes the width W8 of the tooth portions forming the interdigitally electret film 42 and the width W8 of the tooth portions forming the interdigital conductive layer 54. As shown in FIG. 14, it has been proved that, in a case where the width W8 of the tooth portions forming the conductive layer 54 is 0.1 mm and a case where the width W8 thereof is 1 mm, the surface potential in the case where the electrode width is 1 mm is higher in any sample. It has been proved that the surface potential of comparative example 2 where the electret film 42 is interdigitally patterned is smaller than the surface potentials of the samples shown in FIG. 13 where the electret films 52 are not patterned. This is conceivably because an area of end surfaces of the interdigitally worked electret film 42 is larger than an area of end surface of each electret film 52 and hence the surface potential is reduced due to flow out of the charges from these end surfaces. Thus, it has been confirmed that the surface potential in the case where the electret film is patterned is reduced as compared with a case of no patterning.

Figure 15:
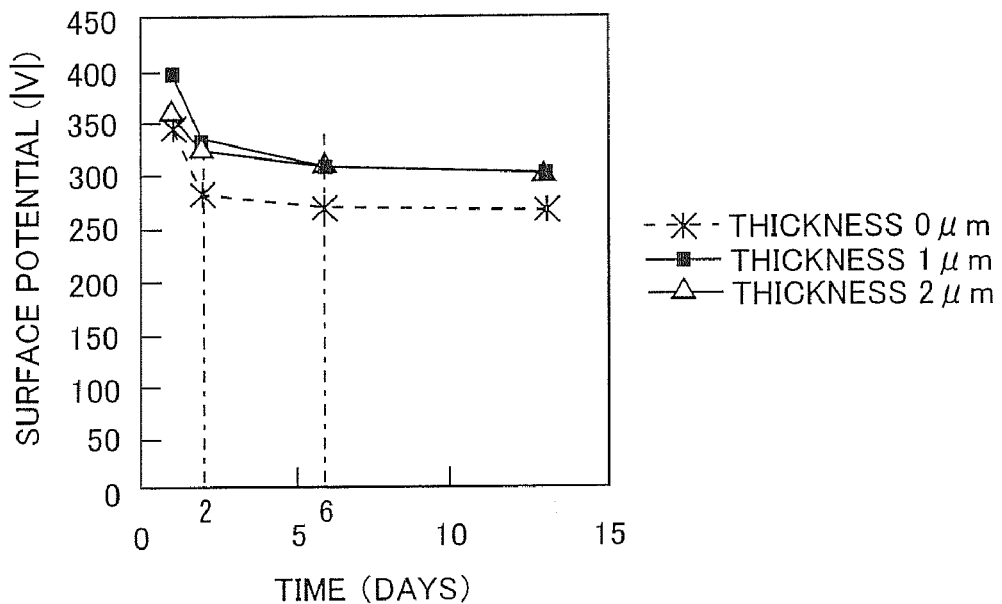
FIG. 15 A diagram showing changes in the surface potentials of the electret films with time.

FIG. 15 shows changes in the surface potentials of the samples shown in FIG. 13 with change. The axis of ordinate denotes absolute values of the surface potentials of the electret films 52. The axis of abscissa denotes time (days). As shown in FIG. 15, it has been proved that the surface potentials are reduced as time passes in any case where the thickness of the insulating film 53 is 0 μm, 1 μm and 2 μm. However, the reduced quantities of the surface potentials are greatly reduced on first to second days, but gradually reduced after the second day. It has been proved that the surface potentials in the cases where the thicknesses of the insulating films 53 are 1 μm and 2 μm are larger than the surface potential in the case where the thickness of the insulating film 53 is 0 μm (no insulating film). In the case where the thickness of the insulating film 53 is 1 μm and the case where the thickness of the insulating film 53 is 2 μm, the surface potential in the case where the thickness of the insulating film 53 is 1 μm is larger on the first to sixth days, but the thicknesses are substantially the same after the sixth day. From the results shown in FIG. 15, it has been confirmed that flow out of charges from the electret film 52 in the case where the insulating film 53 is formed can be suppressed as compared with the case where no insulating film 53 is formed.

Figure 16:
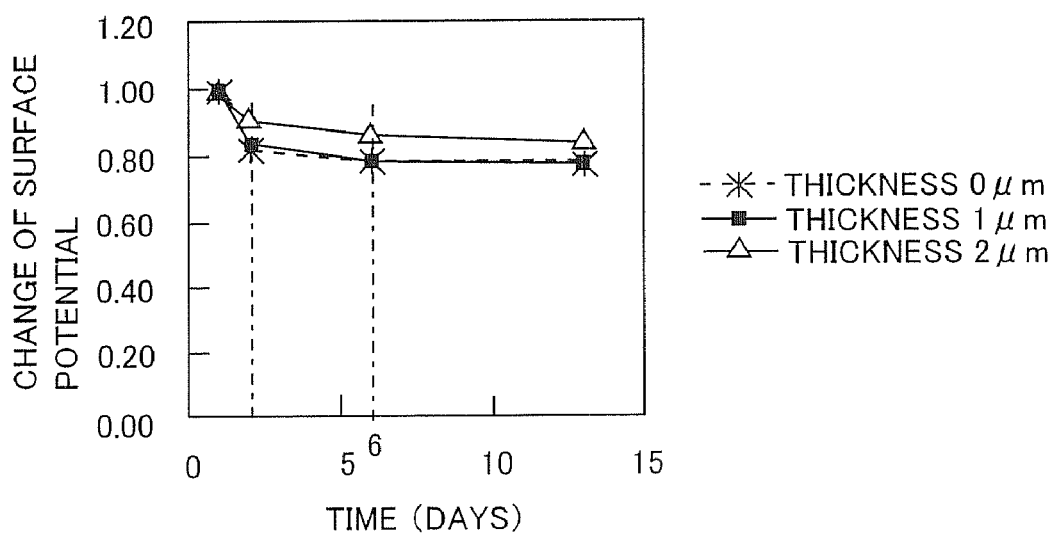
FIG. 16 A diagram showing changes in the surface potentials of the electret films with time.

FIG. 16 shows changes of the surface potentials of the samples shown in FIG. 13 with time. The axis of ordinate denotes changes of the surface potentials of the electret films 52 in a case where the quantity of charges is 1 in injecting charges into the electret films 52. The axis of abscissa denotes time (days). As shown in FIG. 16, it has been proved that the changed quantity of the surface potential in the case where the thickness of the insulating film 53 is 2 μm is smaller than those in the cases where the thicknesses are 0 μm and 1 μm. Thus, it has been confirmed that outflow of charges from the electret film 52 can be further suppressed in the case where the thickness of the insulating film 53 is larger.

The embodiments disclosed this time are to be considered as illustrative in all points and not restrictive. The range of the present invention is shown not by the above description of the embodiments but by the scope of claim for patent, and all modifications within the meaning and range equivalent to the scope of claim for patent are included.

Figure 17:
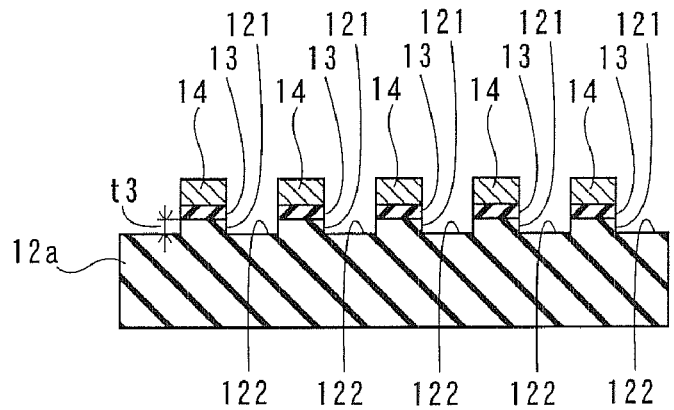
FIG. 17 A sectional view of a fixed electrode section of an electrostatic power generator according to a modification of the first embodiment of the present invention.

For example, while the example where the surface of the electret film 12 on the lower portion of the insulating film 13 is flat is shown in the aforementioned first embodiment, the present invention is not restricted to this but a part of a surface of an electret film 12a may also be etched when a conductive layer 14 and an insulating film 13 are formed by etching, so that the surface of the electret film 12a is formed to have irregularities and the insulating film 13 is arranged on projecting portions 121 of the surface of the electret film 12a, as in a modification shown in FIG. 17. Each projecting portion 121 has a thickness t3 of about 1 nm to about 5000 nm. Thus, recess portions 122 of the electret film 12a storing charges generating electrostatic induction in a movable electrode 22 by opposing to the movable electrode 22 and the conductive layer 14 are separated by the projecting portions 121 of the electret film 12a and an insulating film 14, and hence charges can be further inhibited from flowing out of the recess portions 122 of the electret film 12a to the conductive layer 14.

Figure 18:
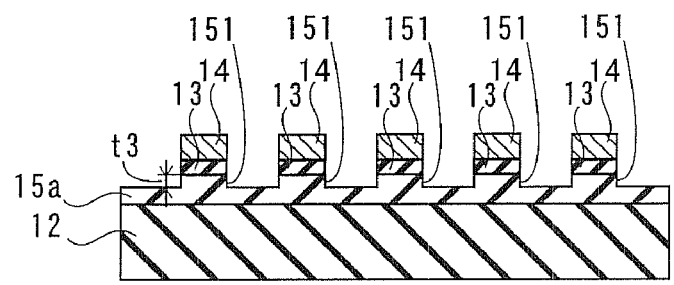
FIG. 18 A sectional view of a fixed electrode section of an electrostatic power generator according to a modification of the second embodiment of the present invention.

While the example where the surface of the charge outflow inhibition film 15 is flat on the lower portion of the conductive layer 14 is flat is shown in the aforementioned second embodiment, the present invention is not restricted to this but a part of a surface of a charge outflow inhibition film 15a may also be etched when a conductive layer 14 is formed by etching, so that the surface of the charge outflow inhibition film 15a is formed to have irregularities and the conductive layer 14 is arranged on projecting portions 151 of the surface of the charge outflow inhibition film 15a, as in a modification shown in FIG. 18. The charge outflow inhibition film 15a is an example of the "second insulating film" in the present invention. Each projecting portion 151 has a thickness t3 of about 1 nm to about 5000 nm.

Figure 19:
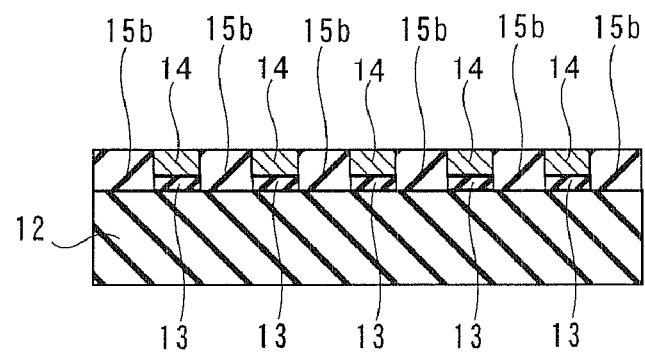
FIG. 19 A sectional view of a fixed electrode section of an electrostatic power generator according to a modification of the second embodiment of the present invention.

While the example of forming the charge outflow inhibition film 15 on the surface of the electret film 12 is shown in the aforementioned second embodiment, the present invention is not restricted to this but an insulating film 13 and a conductive layer 14 may be formed on a surface of an electret film 12 and a charge outflow inhibition film 15b may be formed on a surface, where the insulating film 13 and the conductive layer 14 are not formed, of the surface of the electret film 12, as in a modification shown in FIG. 19. The charge outflow inhibition film 15b is an example of the "second insulating film" in the present invention. Thus, the conductive layer 14 formed on the electret film 12 is inhibited from penetrating between the adjacent movable electrode 22, and hence the movable electrode 22 and the electret film 12 can be inhibited from sticking to each other. Consequently, charges induced in the movable electrode 22 can be inhibited from reduction due to contact between the movable electrode 22 and the electret film 12. According to the aforementioned structure, the electret film 12 can be inhibited from breakage due to contact between the movable electrode 22 and the electret film 12.

Figure 20:
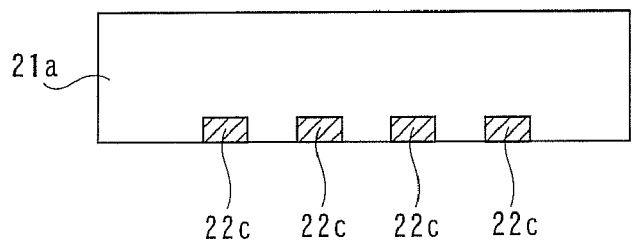
FIG. 20 A sectional view of a movable electrode section of an electrostatic power generator according to a modification of each of the first to sixth embodiments of the present invention.

While the example of forming the movable electrode 22 on the lower surface of the movable substrate 21 is shown in each of the aforementioned first to sixth embodiments, the present invention is not restricted to this but a movable electrode 22c may be embedded in a lower surface of a movable substrate 21a as in a modification shown in FIG. 20. The movable electrode 21a and the movable electrode 22c are examples of the "first substrate" and the "first electrode" in the present invention respectively. Thus, the conductive layer 14 formed on the electret film 12 is inhibited from penetrating the adjacent movable electrode 22c and hence the movable electrode 22c and the electret film 12 can be inhibited from sticking to each other. Consequently, charges induced in the movable electrode 22c can be inhibited from reduction due to contact between the movable electrode 22c and the electret film 12. According to the aforementioned structure, the electret film 12 can be inhibited from breakage due to contact between the movable electrode 22c and the electret film 12.

Figure 21:
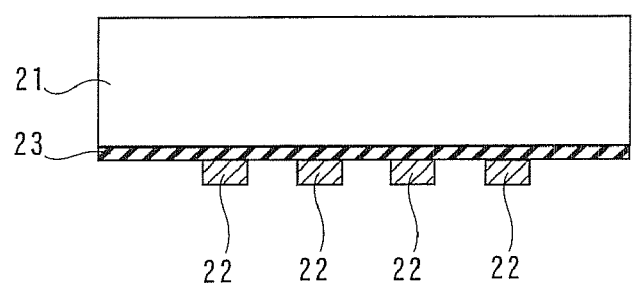
FIG. 21 A sectional view of a movable electrode section of an electrostatic power generator according to a modification of each of the first to sixth embodiments of the present invention.

While the example of forming the movable electrode 22 on the lower surface of the movable substrate 21 is shown in each of the aforementioned first to sixth embodiments, the present invention is not restricted to this but an insulating film 23 may be provided on a lower surface of a movable substrate 21 and a movable electrode 22 may be formed on the lower surface of the insulating film 23 as in a modification shown in FIG. 21. The insulating film 23 is an example of the "third insulating film" in the present invention. Thus, the movable electrode 22 and the movable substrate 21 are not rendered conductive, and hence a conductive substrate made of silicon, a metal plate or the like can be employed as the movable substrate 21.

Figure 22:
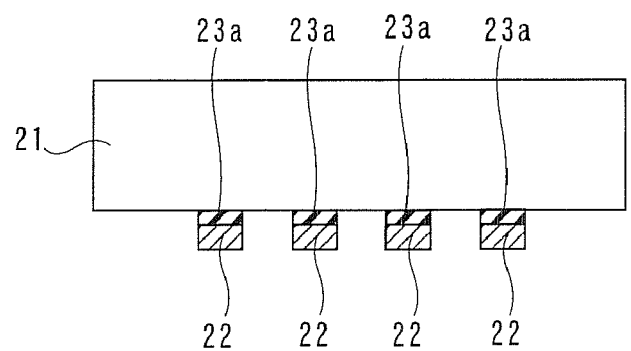
FIG. 22 A sectional view of a movable electrode section of an electrostatic power generator according to a modification of each of the first to sixth embodiments of the present invention.

While the example of forming the movable electrode 22 on the lower surface of the movable substrate 21 is shown in each of the aforementioned first to sixth embodiments, the present invention is not restricted to this but an insulating film 23a may be interposed between a movable substrate 21 and a movable electrode 22 as in a modification shown in FIG. 22. The insulating film 23a is an example of the "third insulating film" in the present invention. Thus, the movable substrate 21 and the movable electrode 22 are not rendered conductive, and hence silicon or a metal plate can be employed for the movable substrate 21.

Figure 23:
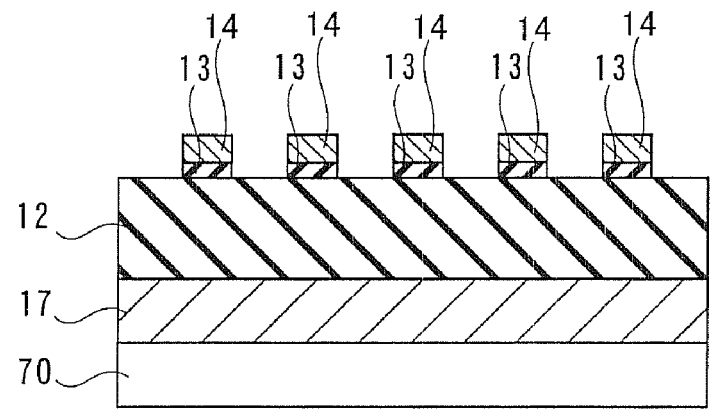
FIG. 23 A sectional view of a fixed electrode section of an electrostatic power generator according to a modification of the first embodiment of the present invention.

While the example where the fixed electrode section 10 includes the fixed substrate 11, the electret film 12, the insulating film 13 and the conductive layer 14 is shown in each of the aforementioned first to sixth embodiments, the present invention is not restricted to this but a conductive layer 17 may be formed on a surface of a fixed substrate 70 made of glass and an electret film 12 may be thereafter formed on a surface of the conductive layer 17, an insulating film 13 may be formed on a surface of the electret film 12 and a conductive layer 14 may be formed on a surface of the insulating film 13, as in a modification shown in FIG. 23. The fixed substrate 70 is an example of the "third substrate" in the present invention. The conductive layer 17 is an example of the "second conductive layer" in the present invention. The conductive layer 17 is connected to the movable electrode 22 through the bridge rectifier circuit 2 shown in FIG. 1. Thus, electrostatic induction can occur between the conductive layer 16 and the movable electrode 22.

Figure 24:
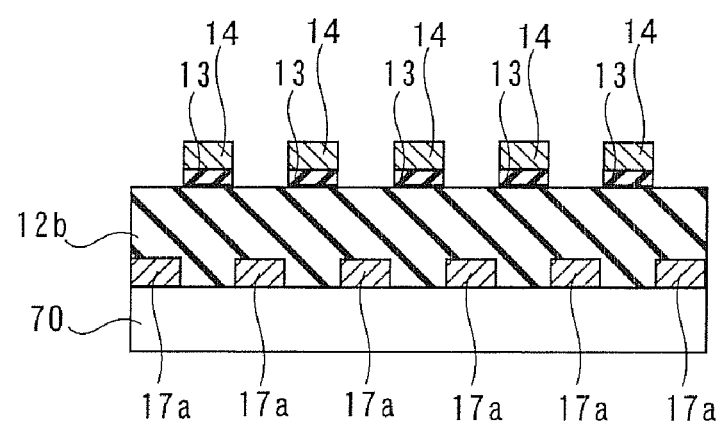
FIG. 24 A sectional view of a fixed electrode section of an electrostatic power generator according to a modification of the first embodiment of the present invention.

While the example of forming the conductive layer 17 on the overall surface of the fixed substrate 70 made of glass is shown in the modification of each of the aforementioned first to sixth embodiments shown in FIG. 23, the present invention is not restricted to this but a conductive layer 17a may be formed on a surface of a fixed substrate 70 made of glass opposed to a surface, where an insulating film 13 is not formed, of an electret film 12b in a sectional manner, and an electret film 12b may be formed on surfaces of the fixed substrate 70 and the conductive layer 17a, as in a modification shown in FIG. 24. The conductive layer 17a is an example of the "second conductive layer" in the present invention.

While the example of employing the movable electrode 22, the conductive layer 14 and the fixed substrate 11 made of Al is shown in each of the aforementioned first to sixth embodiments, the present invention is not restricted to this but a movable electrode 22, a conductive layer 14 and a fixed substrate 11 made of silicon, doped silicon, SiC and a metal may be employed. Ti, Cu, Ni and W can be employed as a metal.

While the example of employing the movable substrate 21 made of glass is shown in each of the aforementioned first to sixth embodiments, the present invention is not restricted to this but a movable substrate 21 made of silicon, quartz, plastic, fluororesin typified by polytetrafluoroethylene (PTFE), a metal plate and SiC may be employed. In a case where silicon and a metal plate are employed as the movable substrate 21, however, the insulating film 23 or the insulating film 23a is required to be interposed between the movable substrate 21 and the movable electrode 22 as shown in FIGS. 21 and 22.

While the example of employing the fixed substrate 70 made of glass is shown in each of modifications shown in FIGS. 23 and 24, the present invention is not restricted to this but a fixed substrate 70 made of fluororesin typified silicon, quartz, plastic and polytetrafluoroethylene (PTFE) and a metal plate may be employed.

While the example of generating power by vibrating the movable electrode section 20 is shown in each of the aforementioned first to sixth embodiments, the present invention is not restricted to this but power may be generated by vibrating the fixed electrode section 10 without vibrating the movable electrode section 20, or power may be generated by vibrating both of the movable electrode section 20 and the fixed electrode section 10.

While the example where the width W5 of interdigital tooth portions forming the conductive layer 14a is formed to be larger than the interval W6 between teeth forming the interdigital movable electrode 22 is shown in the aforementioned fourth embodiment, the present invention is not restricted to this but the width of the tooth portions forming the interdigital movable electrode 22 may be formed to be larger than the width between the teeth forming the interdigital conductive layer 14a.

While the example of forming the changed charges induced in the movable electrode 22 by electrostatic induction as a current, and outputting the same to the load 4 through the bridge rectifier circuit 2 and the DC-DC converter 3 is shown in each of the aforementioned first to sixth embodiments, the present invention is not restricted to this but a current may be outputted to the load 4 through the bridge rectifier circuit 2 or outputted to the load 4 through the DC-DC converter 3.

While the example of grounding the conductive layer or applying the prescribed voltage to the conductive layer 14 is shown in each of the aforementioned first to sixth embodiments, the present invention is not restricted to this but the conductive layer 14 may be in a floating state, that is, the conductive layer 14 is not grounded and the prescribed voltage is not applied to the conductive layer 14.

While the examples of employing the interdigital conductive layers 14 and 14a and the interdigital movable electrodes 22, 22a and 22b are shown in the aforementioned first to sixth embodiments, the present invention is not restricted to this but other shape may be employed so far as the shape causes difference of the quantity of charges induced in the surface of the movable electrode by vibrating the movable electrode.

While the examples of employing the electret films 12, 12a and 12b made of fluororesin typified by polytetrafluoroethylene (PTFE) or a silicon oxide film are shown in the aforementioned first to sixth embodiments, the present invention is not restricted to this but they may be made of other materials so far as the material functions as an electret.

While a case applying the present invention to the electrostatic power generator which is an example of the electrostatic acting device is shown in each of the aforementioned first to sixth embodiments, the present invention is not restricted to this but the present invention may be applied to an electrostatic acting device such as an electrostatic actuator other than electrostatic power generator.

The invention claimed is:

1. An electrostatic acting device comprising:
a first electrode section (20, 20a) including a first electrode (22, 22a, 22b, 22c);
a second electrode section (10, 10a, 10b, 10c, 10d) provided to be opposed to said first electrode section at a prescribed distance and including an electret film (12, 12a) capable of storing charges and a first conductive layer (14, 14a, 14b) formed on a prescribed region of an upper surface of said electret film; and
a first insulating film (13, 13a) interposed between said electret film and said first conductive layer, wherein
said first conductive layer and said first insulating film are formed in substantially the same shape in plan view.

2. The electrostatic acting device according to claim 1, further comprising a second insulating film (15, 15a, 15b) formed on a surface, opposed to said first electrode, of said electret film, and inhibiting charges from flowing out of the surface of said electret film.

3. The electrostatic acting device according to claim 2, wherein
said second insulating film is formed on an overall surface of said electret film.

4. The electrostatic acting device according to claim 2, wherein
said first insulating film is formed on a surface of said second insulating film, and
the surface, on which said first insulating film is formed, of said second insulating film is convexed.

5. The electrostatic acting device according to claim 2, wherein
said second insulating film is formed on the surface of said electret film, side surfaces of said first insulating film and side surface of said first conductive layer.

6. The electrostatic acting device according to claim 1, wherein
said first electrode includes a plurality of first electrode portions provided at a first interval, and a width of said first conductive layer is larger than said first interval between adjacent said first electrode portions.

7. The electrostatic acting device according to claim 1, wherein
said first electrode section further includes a first substrate (21, 21a) having a surface formed with said first electrode, and
a height from the surface of said electret film to a surface of said first conductive layer on a side of said first electrode is larger than a thickness of said first electrode formed on said first substrate.

8. The electrostatic acting device according to claim 7, wherein
a third insulating film (23, 23a) is formed between said first substrate and said first electrode.

9. The electrostatic acting device according to claim 8, wherein
said third insulating film is so formed as to cover a surface of said first substrate.

10. The electrostatic acting device according to claim 8, wherein
said third insulating film has the same shape as said first electrode in plan view.

11. The electrostatic acting device according to claim 1, wherein
said first conductive layer is grounded.

12. The electrostatic acting device according to claim 1, wherein
a prescribed voltage is applied to said first conductive layer.

13. The electrostatic acting device according to claim 1, wherein
a surface, on which said first insulating film is formed, of said electret film is convexed.

14. The electrostatic acting device according to claim 1, wherein
said second electrode section includes a conductive second substrate (11) having a surface formed with said electret film.

15. The electrostatic acting device according to claim 14, wherein
said first electrode and said second substrate are connected to each other through a bridge rectifier circuit (2, 2a, 2b).

16. The electrostatic acting device according to claim 1, wherein
said second electrode section includes:
an insulating third substrate (70) having a surface formed with said electret film, and
a second conductive layer (17, 17a) formed between said third substrate and said electret film.

17. The electrostatic acting device according to claim 16, wherein
said second conductive layer is so formed as to cover a surface of said third substrate.

18. The electrostatic acting device according to claim 16, wherein
said second conductive layer has the same shape as said first conductive layer in plan view.

19. The electrostatic acting device according to claim 16, wherein
said first electrode and said second conductive layer are connected to each other through a bridge rectifier circuit.

* * * * *